Oct. 15, 1957 — W. A. RAY — 2,809,662
VALVE STRUCTURE
Filed May 29, 1953 — 2 Sheets-Sheet 1

INVENTOR,
WILLIAM A. RAY
BY
John H. Rouse,
ATTORNEY.

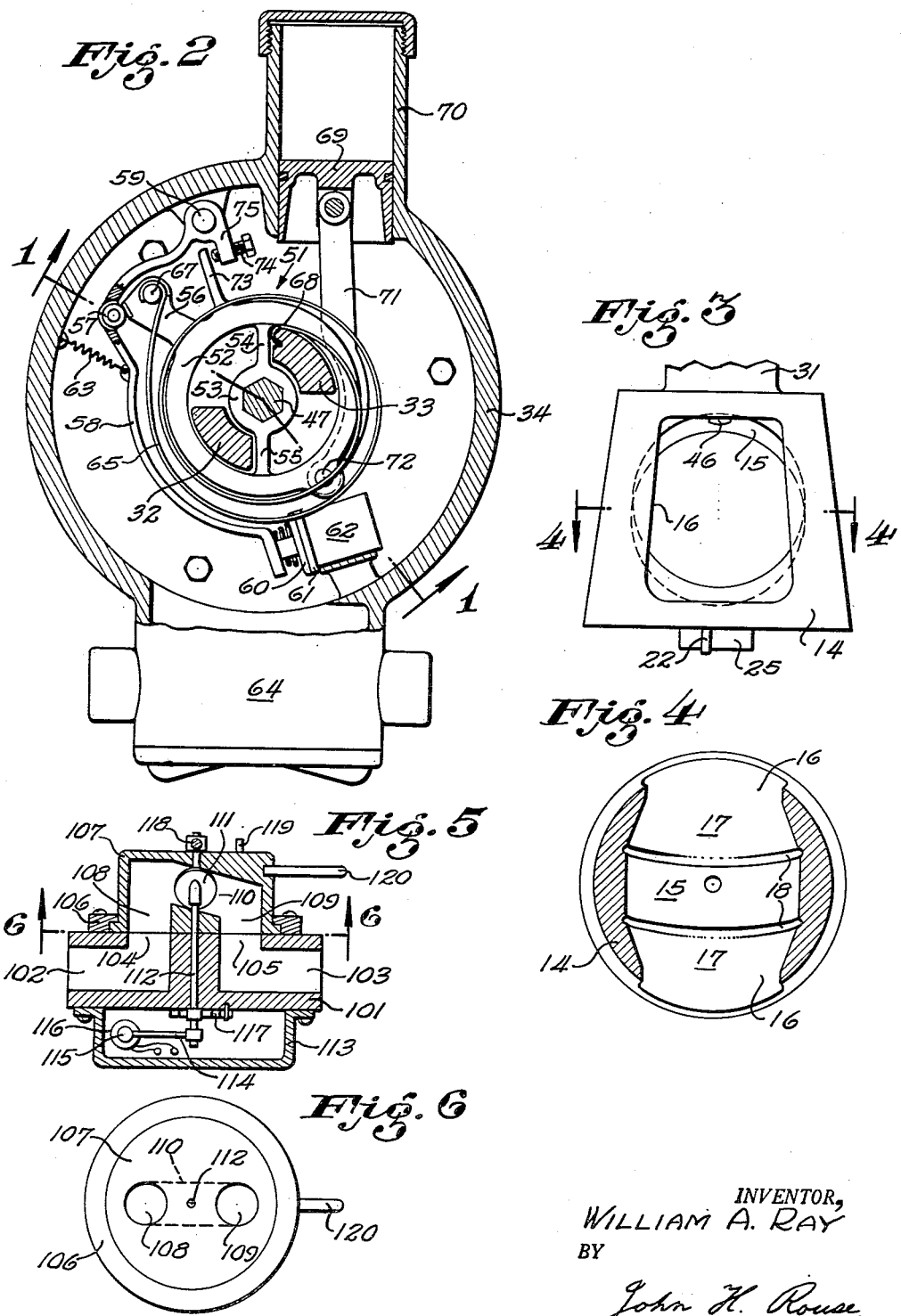

United States Patent Office 2,809,662
Patented Oct. 15, 1957

2,809,662

VALVE STRUCTURE

William A. Ray, North Hollywood, Calif., assignor to General Controls Co., Glendale, Calif., a corporation of California Application May 29, 1953, Serial No. 358,303

10 Claims. (Cl. 137—614.17)

This invention relates to valve structures of the type wherein the main closure member is in the form of a rotary plug or a thick plate having a flow passage therethrough, and more particularly to the combination therewith of supplemental or safety closure means in said passage; the present invention being similar to, and in some respects an improvement on, the invention disclosed in my copending application Serial No. 293,813, filed June 16, 1952, now Patent No. 2,754,846, granted July 17, 1956.

In the valve structure shown in said copending application, the main closure member is in the form of a rotary plug having a cylindrical through passage at right-angles to its axis of rotation; the supplemental closure means being a disk of the same diameter as that of the passage and rotatable therein between open and closed positions. The stem of the disk is arranged at an acute angle to the axis of rotation of the plug, and the plane of the disk at a complemental angle to the stem, so that when the disk is in passage-closing position, with its rim in full engagement with the wall of the passage, portions of the rim are at opposite sides of the stem and bear on surfaces of the passage spaced from the openings in which the stem rotates. Since, in the valve structure of the copending application, the disk-stem is not on the axis of rotation of the plug, a bevel-gear connection is provided so that the plug and disk can be rotated by means of a common handle.

An object of this invention is to arrange the disk-stem coaxially with the plug (or with a plate-like rotary closure member) so that the requirement for such as a bevel-gear connection is avoided, and I accomplish this object by forming a portion of the plug-passage, with which portion the disk cooperates, so that its axis is at an angle other than at right-angles to the axis of rotation of the plug.

Another object is to provide improved means for normally holding the supplemental closure means stationary relative to the valve structure, and for resetting the supplemental closure means to normal position after (in response to establishment of an abnormal degree of a controlling condition) the supplemental closure means has been released to effect closing of the plug-passage.

Another object is to so form the plug-passage that its flow capacity is increased.

Another object is to provide means for producing friction resisting rotation of the plug, without increasing the friction between the plug and its seat.

Another object is to provide means for positively preventing appreciable movement of the plug in directions along its axis of rotation.

For full understanding of the invention, and for further appreciation of its objects and advantages, reference is to be had to the following detailed description and accompanying drawing, and to the appended claims.

In the drawing:

Figure 1 is a vertical sectional view, taken generally along the irregular line 1—1 of Fig. 2, of a valve structure embodying this invention; the main closure member, or plug 14, and the supplemental closure means, comprising disk 41, both being shown in open position;

Figure 2 is a transverse section through housing 34, taken generally along the line 2—2 of Fig. 1;

Figure 3 is a side view, to reduced scale, of the plug 14;

Figure 4 is a transverse section taken along the line 4—4 of Fig. 3;

Figure 5 is a diagrammatic view, in section, of a modified form of valve structure according to this invention; and Figure 6 is a view, looking upwards, taken along the line 6—6 of Fig. 5.

Figures 1, 1A:
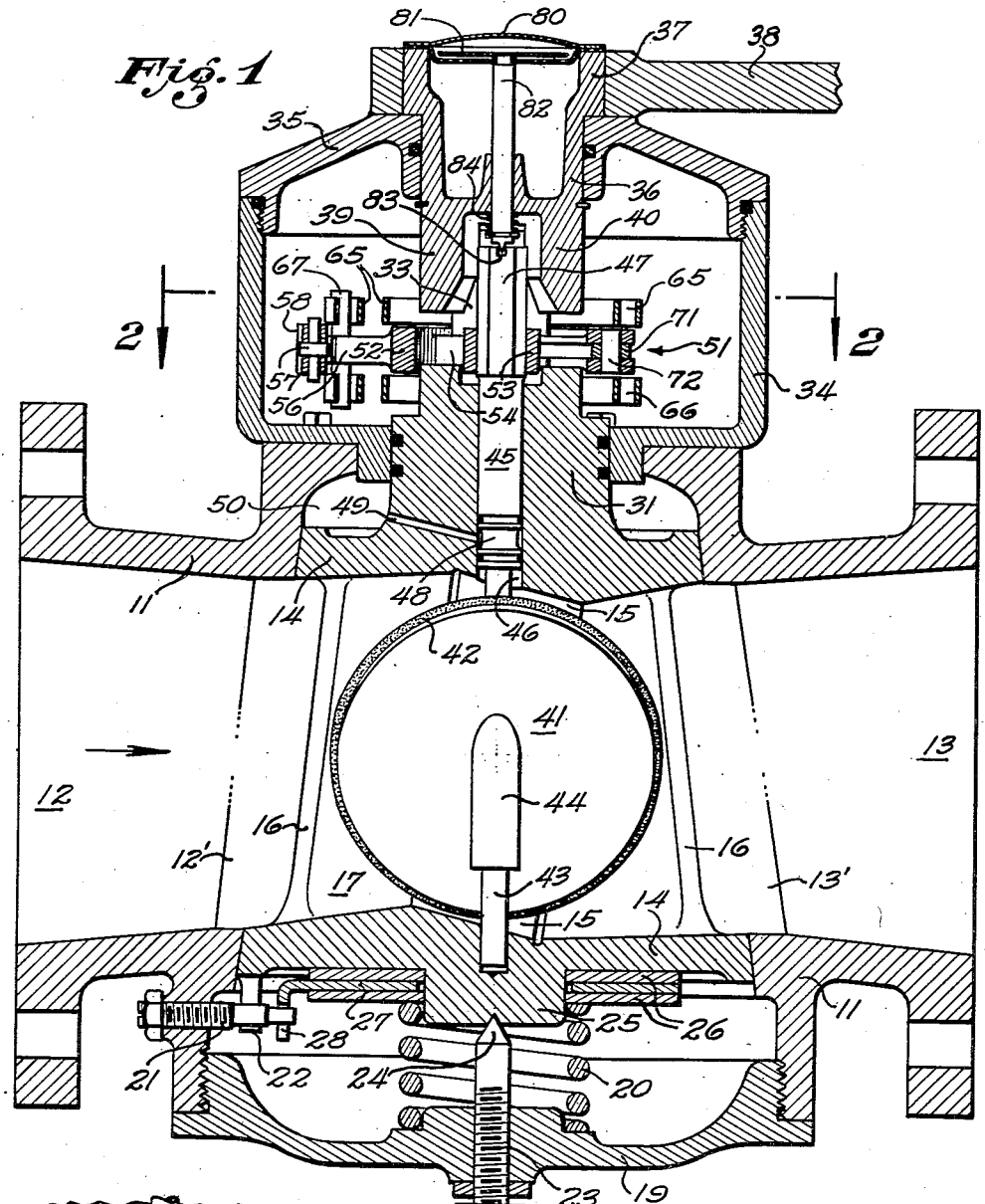
Figure 1a is a fragmentary sectional view, to reduced scale, showing disk 41 in closed position.

Referring first more particularly to Figs. 1–4 of the drawing, the numeral 11 indicates a valve casing having aligned openings 12 and 13 for flow through the casing, preferably in the direction of the arrow; the casing being formed internally to provide a tapered seat or cavity for a correspondingly tapered main closure member or plug 14. This plug has a transverse passage therethrough which, in the position of the plug as shown in the drawing, is in register with the inner ends 12' and 13' of the casing openings 12 and 13.

The plug-passage comprises a medial cylindrical portion 15 whose axis, instead of being at right-angles to the axis of rotation of the plug, is inclined therefrom at an angle of about 15°. As is best seen in Figs. 3 and 4, the short outer portions 16 of the plug-passage are straight-sided and define generally rectangular openings of approximately the same area as the medial cylindrical portion 15; the other portions 17 of the passage being shaped so that their opposite ends conform to the shapes of portions 15 and 16. Grooves 18 are provided at the ends of the cylindrical portion 15 to facilitate boring that portion.

The inner ends 12', 13' of the casing openings are shaped to conform to the openings 16 at the outer ends of the plug pasage. By making these ends generally rectangular, they can be of relatively large area (and the diameter of passage-portion 15 correspondingly large) while preserving adequate separation of the casing- and plug-openings when the plug is rotated through 90° to its fully-closed position.

The opening at the bottom of the valve casing below plug 14 is closed by a threaded plate 19, and interposed between this plate and the plug is a spring 20 forcing the plug upwards against its seat. Rotation of the plug is limited to an angle of about 90° by a stop screw 21 cooperating with a lug 22 depending from the plug, and by another stop (not shown) at the back of the casing.

Threaded in an opening through a thickened central part of plate 19 is a screw 23 having a conical tip 24 which projects within a conforming recess in a boss 25 on the bottom of the plug, screw 23 being so adjusted that appreciable downward movement of the plug is prevented; the relatively rigid support for the plug thus provided having particular utility during assembly and repair of the valve structure.

At the underside of plug 14, between the plug and spring 20, is a series or stack of plates having central openings for boss 25; the outer ones 26 of these plates being arranged so that they rotate with the plug (as by making boss 25 and the opening in these plates conformingly non-circular); the middle plate 27 being clearanced from boss 25 and having a bent extension 28 notched to straddle the extremity of stop-screw 21 so that plate 27 is held stationary relative to the casing when the plug is rotated. By this arrangement the desired amount of friction resisting rotation of the plug can be produced, without increasing the friction between the plug and its socket.

The plug 14 has at its top a cylindrical shank portion 31 which projects through an opening in the top of the valve casing; the top part of the shank being reduced in diameter and bifurcated to provide a pair of lugs or dogs 32, 33 (see Fig. 2). Around the plug shank, and secured to the top of the casing, is a cup-shaped housing 34 having in its bottom wall an opening wherein the lower part of shank 31 sealingly fits. At the top of housing 34 is a threaded cover 35 having a central opening for a cylindrical member 36 which includes a hexagonal outer portion 37 for attachment of a handle 38. The lower end of member 36 is bifurcated to provide a pair of dogs 39, 40 which fit in the spaces between the upper portions of dogs 32, 33 (Fig. 2) to form a dog-clutch or driving connection between the handle 37 and plug 14.

Cooperating with the inclined cylindrical portion 15 of the plug-passage is a closure disk 41 which is shown in Fig. 1 in a position wherein the plane of the disk lies along the axis of the passage-portion so that the plug-passage is virtually fully-open; the disk being shown in the fragmentary view of Fig. 1a as being rotated through 90° from the position of Fig. 1 to its closed position wherein the rim of the disk (formed by a ring 42 of material such as rubber) is in full engagement with the wall of the passage-portion 15.

The disk 41 is mounted on a stem 43, guided at its ends in openings in and coaxial with plug 14, at an angle to the stem such that the plane of the disk is at right-angles to the axis of passage-portion 15 when the disk is in its closed position as shown in Fig. 1a, the rim 42 of the disk then bearing on surfaces of the passage-portion at opposite sides of the stem, and spaced from the openings in which the stem rotates, so that there is no possibility of leakage past the disk. A mounting sleeve 44 is rigidly joined to the disk and may be rigidly and sealingly secured to stem 43. Optionally, the sleeve 44 may have a non-circular through opening for a correspondingly shaped portion of the stem so that slight movement of the disk along the axis of the stem is permitted; it then being necessary, of course, to provide a seal, such as an O-ring, between the stem and the sleeve, as is shown in Fig. 2 of said copending application.

The upper portion 45 of stem 43 is of larger diameter and extends sealingly upwards through an opening 46 in the plug-shank 31; the uppermost portion 47 of the disk-stem, above the plug-shank and between dogs 32—33, being hexagonal in cross-section. At its lower end the stem-portion 45 has a groove 48 which is in communication, through a passageway 49, with a space 50 around the top of the plug, so that any fluid from inlet 12 which may leak around the stem-portion is vented; it being assumed that there is a vent opening leading from space 50 to the exterior of the casing.

The handle- or driving-dogs 39, 40 are relatively short and mesh with only the upper portions of the plug- or driven-dogs 32, 33 so that there is a space between the bottoms of dogs 39, 40 and the top surface of the plug stem 31 between dogs 32, 33. This space is provided to accommodate means for rotating the disk 41 to a predetermined controlling position and for normally holding the disk in that position. These means comprise a member, generally indicated at 51, having a generally-circular outer portion 52, a central or hub portion 53 around the hexagonal part 47 of the disk-stem and having an opening fitting that part, and a pair of radial arms 54, 55 joining the portions 52 and 53.

As is better seen in Fig. 2, the member 51 has a radial projection 56 whose tip is shown in engagement with a roller 57 carried by a curved latching-lever 58. This lever is pivoted near one of its ends on a pin 59 fixed to housing 34 and carries at its other end a rockably-mounted armature 60 cooperable with the pole-piece 61 of an electromagnet 62 fixed to the housing. Energization of the electromagnet is controlled, in conventional manner, by means (not shown) responsive to a condition, such as temperature or pressure, external to the valve structure; the arrangement being such that the electromagnet is energized while said condition is normal or safe, so that the latch-lever 58 is then held in the position shown in Figs. 1 and 2 against the force of a spring 63 stretched between it and the housing. At the front of the valve structure (see Fig. 2) is a junction box 64 for connections to the electromagnet, and for parts (not shown) such as an A. C. rectifier or a voltage-dropping resistor.

The disk-operating member 51 is urged to rotate, in counterclockwise direction as viewed from the top, by the force of a pair of spiral springs 65, 66 connected at one of their respective ends to a pin 67 on projection 56, and at their other ends to the plug-dog 33 as indicated at 68 in Fig. 2.

When, upon establishment of an abnormal degree of the controlling condition, the electromagnet 62 is deenergized, the latch-lever 58 is released and rocks clockwise into engagement with the side wall of housing 34, so that roller 57 is disengaged from projection 56. The disk-operating member 51 is then free to rotate counterclockwise under the force of springs 65, 66—disk 41 rotating therewith to its closed position as shown in Fig. 1a, the arms 54 and 55 of member 51 then being substantially in engagement with the sides of the plug-dogs 32 and 33, respectively.

Springs 65, 66 are designed to exert a high degree of force sufficient to ensure movement of disk 41 to closed position. To avoid shock, dash-pot means for retarding this movement of the disk are provided, which means comprise a piston 69 working in a cylinder 70 formed as a lateral extension of housing 34. The piston is operatively connected to disk 41 by a link 71 pivoted at one end on the piston and at its other end on a pin 72 fixed to the outer portion 52 of member 51, which portion is slotted to receive part of the link, as can be seen in Fig. 1.

To reset disk 41 to its normal open position, the plug 14 is rotated by means of handle 38 in clockwise direction so that, through dogs 32 and 33 and arms 54 and 55, corresponding rotation of member 51 and the disk is effected. When the parts have been rotated in this manner through slightly less than 90°, a finger 73 on member 51 engages a screw 74 adjustably mounted on a bent extension 75 of latch-lever 58 and, by continued movement, effects counterclockwise rocking of the lever to bring armature 60 into engagement with the pole-piece of electromagnet 62 and the latch roller 57 into position for engagement by the tip of projection 56 when the plug is returned toward its open position; it being assumed that the fault that caused deenergization of the electromagnet had been corrected and that the electromagnet is again energized.

For indicating the position of disk 41 relative to the valve structure, there is at the top of the structure, behind a window 80, a pointer 81 carried by a rod 82 whose bottom is formed to fit in a slot 83 in the top of the uppermost portion 47 of the disk-stem; rod 82 being maintained by a light spring 84 in driven relation to the disk-stem.

In normal operation, the plug 14 is rotated by its handle 38 between its fully-open position, as shown in the drawing, and a fully-closed position at about 90° from that position; or to an intermediate throttling position. Inasmuch as the disk is normally held stationary relative to the valve casing, there is movement of the disk in the plug-passage when the plug is rotated, so that the possibility of sticking of the disk or its stem (which might be caused by matter deposited from the fluid passing through the valve) is greatly reduced. It will be observed that when the plug is in its fully-closed position the disk is in the same position relative to the plug-passage, and when the plug is in partly-open position the disk is in a corresponding flow-controlling position. When, in response to deenergization of electromagnet 62, the disk is released, it remains in passage-closing position during subsequent movements of the plug unless and until the latch-lever 58 is reset as previously described.

The modified form of the invention shown more-or-less diagrammatically in Figs. 5 and 6 comprises a generally circular casing 101 having openings 102 and 103 for flow through the casing, these openings having cylindrical vertical extensions 104 and 105 at their inner ends. On the flat top of casing 101, and held in sealing engagement therewith by a ring 106, is a closure member 107 of the rotary-plate type having a passage therethrough comprising cylindrical vertical end-portions 108 and 109 which are in register with the casing openings 104 and 105 when the closure member is in its open position as shown. The passage-portions 108, 109 are joined by a cylindrical transverse portion 110 which is inclined at about 15° from horizontal. Within the passage-portion 110 is a supplemental closure disk 111 fixedly mounted on a step 112 guided in aligned vertical openings in the casing and the closure member and on the axis of rotation of the same. The disk 111 is mounted at an angle to stem 112 such that, when the disk is rotated in counterclockwise direction through 90° from its position as shown, the plane of the rim of the disk in full engagement with the wall of that portion; the arrangement being substantially the same as in Figs. 1 and 1a. At the underside of the valve casing, within a housing 113, is an arm 114 which is secured at one end to stem 112 and carries on its other end an armature 115 cooperable with an electromagnet 116 whereby the stem and disk are normally held stationary relative to the casing against the force of a spiral spring 117, the casing against the force of a spiral spring 117, attached to the stem and to the casing, which urges the disk counterclockwise toward closed position. Secured to stem 112 at the top of the structure is an arm 118 which, when the disk has been released to its closed position, is in engagement with a stop-pin 119 on top of closure member 107, so that subsequent clockwise rotation of the closure member, by means of its handle 120, can effect resetting of the disk to normal position. From the foregoing it is believed to be clear that operation of the modified valve structure of Figs. 5–6 is generally the same as that of the structure shown in the other figures.

The embodiments of my invention herein shown and described are obviously susceptible of modification without departing from the spirit of the invention, and I intend therefore to be limited only by the scope of the appended claims.

I claim as my invention:

1. In a valve structure: a casing having an inlet and an outlet opening whose inner ends extend to surfaces of the casing; a closure member mounted for rotation relative to said casing and having surfaces slidable on said casing surfaces, said closure member having a passage therethrough extending to said surfaces thereof, the opposite ends of said passage being arranged so that they are in communication respectively with said inlet and outlet openings when the closure member is in one controlling position and out of communication with said openings when the closure member is rotated to an alternate controlling position; a portion of said passage being generally cylindrical and transverse to the axis of rotation of the closure member; and a closure disk in said passage-portion having a stem coaxial with said closure member and rotatable in an opening in the wall of the passage-portion, said disk conforming in diameter to the passage-portion and being rotatable with said stem between one position wherein the rim of the disk is in full engagement with the wall of the passage-portion and said passage is thereby closed, and another position wherein major portions of said rim are out of engagement with said wall so that the passage is then open; said passage-portion being at an acute angle to said stem, and the plane of said disk being at an angle to the stem complemental to said acute angle, so that when the disk is in its passage-closing position portions of the rim of the disk bear on diametrically-opposite surfaces of the wall of the passage-portion spaced from the stem and at opposite sides thereof.

2. A valve structure as defined in claim 1, and including means, cooperating with the stem of said disk, for normally holding the disk stationary relative to the casing, so that there is relative rotation between the disk and said closure member when the closure member is rotated.

3. A valve structure as defined in claim 1, and including means, cooperating with the stem of said disk, for normally holding the disk stationary relative to the casing and in a position such that when said closure member is rotated to said alternate position, wherein said passage is out of communication with said casing openings, the disk is in said one of its positions wherein the passage is closed.

4. A valve structure as defined in claim 1, and including means, responsive to a condition external of the valve structure and cooperating with the stem of said disk, for normally holding the disk stationary relative to the casing and in a position such that when said closure member is in said one of its positions, wherein said passage is in communication with said casing openings, the disk is in its passage-open position; and means urging the disk toward its passage-closed position.

5. A valve structure as defined in claim 1, and including means, responsive to a condition external of the valve structure and cooperating with the stem of said disk, for normally holding the disk stationary relative to the casing and in a position such that when said closure member is in said one of its positions, wherein said passage is in communication with said casing openings, the disk is in its passage-open position; and a spring, connected between the disk and the closure member, urging the disk toward its passage-closed position.

6. A valve structure as defined in claim 1, and including means, responsive to a condition external of the valve structure and cooperating with the stem of said disk, for normally holding the disk stationary relative to the casing and in a position such that when said closure member is in said one of its positions, wherein said passage is in communication with said casing openings, the disk is in its passage-open position; a spring urging the disk toward its passage-closed position; the arrangement being such that upon establishment of an abnormal degree of said condition the disk is released and moves under the force of said spring to said passage-closed position; and means forming a connection between the closure member and the disk such that subsequent rotation of the closure member to its alternate position, wherein the passage is out of communication with said casing openings, effects return of the disk to its passage-open position.

7. A valve structure as defined in claim 1, and including means, responsive to a condition external of the valve structure and cooperating with the stem of said disk, for normally holding the disk stationary relative to the casing and in a position such that when said closure member is in said one of its positions, wherein said passage is in communication with said casing openings, the disk is in its passage-open position; a spring urging the disk toward its passage-closed position; the arrangement being such that upon establishment of an abnormal degree of said condition the disk is released and moves under the force of said spring to said passage-closed position; an arm branching from said stem; and means on the closure member forming a stop for said arm, said stop being so positioned that when the disk moves to its passage-closed position the arm is substantially in engagement with the stop, so that subsequent rotation of the closure member to its alternate position, wherein the passage is out of communication with said casing openings, effects return of the disk to its passage-open position.

8. A valve structure as defined in claim 1, and wherein said rim of the disk is in the form of a ring of rubber-like material.

9. A valve structure as defined in claim 1, and wherein said closure member is in the form of an elongated plug, circular in cross-section, and said casing has a cavity defining said casing-surfaces on which the circular surfaces of said plug are slidable.

10. In a valve structure: a valve casing; a closure member comprising a plug seated in a conforming cavity in said casing; said casing having an inlet opening and an outlet opening each extending to said cavity; said plug having a passage therethrough adapted, when the plug is in one controlling position, to register with said openings and establish communication therebetween, said plug being rotatable on its seat to another position wherein said passage is out of communication with said openings; a closure disk in said plug-passage and rotatable to open and close the passage, said disk having a stem rotatable in an opening in the plug coaxial therewith and having a portion extending beyond one end of the plug; means fixed to said stem-portion and including an arm projecting generally radially therefrom; means on said casing for normally holding said arm so that there is then relative rotation between the disk and the plug when the plug is rotated, the arrangement being such that said disk is normally held in a position such that when said plug is in said one controlling position the disk is in passage-open position; and a spring, connected between the plug said stem-portion and encircling the stem-portion, urging the disk toward passage-closing position.

References Cited in the file of this patent

UNITED STATES PATENTS

| | | |
|---|---|---|
| 699,818 | Rylands | May 13, 1902 |
| 1,037,630 | Jones | Sept. 3, 1912 |
| 1,106,594 | Teherniakofsky | Aug. 11, 1914 |
| 1,157,235 | McElroy | Oct. 19, 1915 |
| 1,354,522 | Takala | Oct. 5, 1920 |
| 1,671,069 | De Wein | May 22, 1929 |
| 2,014,101 | Bryan | Sept. 10, 1935 |
| 2,058,996 | Kollberg | Oct. 27, 1936 |
| 2,110,924 | Teed | Mar. 15, 1938 |
| 2,165,874 | Sauls | July 11, 1939 |
| 2,209,397 | Gannestad | July 30, 1940 |
| 2,218,606 | Foster | Oct. 22, 1940 |
| 2,350,441 | Anderson | June 6, 1944 |
| 2,505,145 | Ryan | Apr. 25, 1950 |

FOREIGN PATENTS

| | | |
|---|---|---|
| 580,926 | Germany | July 6, 1933 |